United States Patent
Bienstman et al.

(10) Patent No.: US 10,082,624 B2
(45) Date of Patent: Sep. 25, 2018

(54) SYSTEM FOR COUPLING RADIATION INTO A WAVEGUIDE

(71) Applicants: UNIVERSITEIT GENT, Ghent (BE); IMEC VZW, Leuven (BE)

(72) Inventors: Peter Bienstman, Ghent (BE); Sam Werquin, Ghent (BE)

(73) Assignees: UNIVERSITEIT GENT, Ghent (BE); IMEC VZW, Leuven (BE)

(*) Notice: Subject to any disclaimer, the term of this patent is extended or adjusted under 35 U.S.C. 154(b) by 0 days.

(21) Appl. No.: 15/115,155

(22) PCT Filed: Jan. 29, 2015

(86) PCT No.: PCT/EP2015/051867
§ 371 (c)(1),
(2) Date: Jul. 28, 2016

(87) PCT Pub. No.: WO2015/114067
PCT Pub. Date: Aug. 6, 2015

(65) Prior Publication Data
US 2016/0341895 A1    Nov. 24, 2016

(30) Foreign Application Priority Data

Jan. 29, 2014  (EP) .................... 14153146

(51) Int. Cl.
*G02B 6/124* (2006.01)
*G02B 6/13* (2006.01)
(Continued)

(52) U.S. Cl.
CPC .......... *G02B 6/124* (2013.01); *G02B 5/1857* (2013.01); *G02B 6/1228* (2013.01); *G02B 6/13* (2013.01); *G02B 6/34* (2013.01); *G02B 6/29323* (2013.01)

(58) Field of Classification Search
CPC ........ G02B 6/124; G02B 6/1228; G02B 6/13; G02B 6/34; G02B 6/29323; G02B 5/1857
See application file for complete search history.

(56) References Cited

U.S. PATENT DOCUMENTS 7,065,272 B2 * 6/2006 Taillaert ................. B82Y 20/00
                                                        359/563
8,233,204 B1 * 7/2012 Robbins ............... G02B 5/1828
                                                          345/7
(Continued)

FOREIGN PATENT DOCUMENTS

JP     H08320219 A    12/1996
WO    2005114276 A1   12/2005

OTHER PUBLICATIONS

Extended European Search Report for corresponding European Application No. 14153146.7, dated Nov. 6, 2014.
(Continued)

*Primary Examiner* — Ryan Lepisto
(74) *Attorney, Agent, or Firm* — Workman Nydegger

(57) ABSTRACT

A photonics integrated device for coupling radiation using flood illumination is disclosed. The photonic integrated device comprises an integrated waveguide, a coupler grating at the surface of the device for coupling radiation from said flood illumination towards the integrated waveguide, and a grating for blocking, reflecting or redirecting radiation away from the coupler grating at the surface of the device. The grating for blocking, reflecting or redirecting radiation away from the coupler grating thereby is positioned relative to the coupler grating so as to prevent at least some radiation from said flood illumination, impinging at the grating for blocking, reflecting or redirecting radiation away from the coupler grating and thus impinging at a position of said surface away from the coupling grating, from being reflected within the device towards the coupler grating.

9 Claims, 6 Drawing Sheets

(51) Int. Cl.
  *G02B 6/122* (2006.01)
  *G02B 5/18* (2006.01)
  *G02B 6/34* (2006.01)
  *G02B 6/293* (2006.01)

(56) References Cited

U.S. PATENT DOCUMENTS 8,325,347 B2 * 12/2012 Cottier .................. G01N 21/45
  356/477
2009/0290837 A1 * 11/2009 Chen ....................... G02B 6/34
  385/37

OTHER PUBLICATIONS

International Search Report for corresponding International PCT Application No. PCT/EP2015/051867, dated Apr. 23, 2015.

Patko et al. "Single Beam Grating Coupled Interferometry: High Resolution Miniaturized Label-Free Sensor for Plate Based Parallel Screening," Optics Express, Oct. 8, 2012, pp. 23162-23173, vol. 20, No. 21.

Werquin et al., "Improved Performance of Highly Multiplexed Silicon-on-Insulator Microring Sensor Chips by Surface Structure Implementation," Proceeding of SPIE, Feb. 20, 2014, pp. 89540O1-89540O8, vol. 8954.

Zhou et al., "Large Fabrication Tolerance for VCSELs using High-Contrast Grating," IEEE Photonics Technology Letters, Mar. 15, 2008, pp. 434-436, vol. 20, No. 6.

* cited by examiner

SYSTEM FOR COUPLING RADIATION INTO A WAVEGUIDE

FIELD OF THE INVENTION

The invention relates to the field of optics. More particularly it relates to methods and systems for efficiently coupling radiation to a waveguide, e.g. when flood illumination is used.

BACKGROUND OF THE INVENTION

Photonic integrated circuits are applied in many application fields such as in the area of fiber-optic communication, biomedical applications, photonic computing, signal processing, etc. Such photonic integrated circuits typically may comprise a number of optical elements such as a detector, a source, a resonator or another radiation processing element, interconnected through waveguides. For radiation coupling to a photonics integrated circuit, grating coupling still by far is the most commonly used solution.

Proper alignment between the incident radiation beam, e.g. stemming from an optical fiber or another radiation source, and the grating is often crucial for having a good coupling of the radiation into the waveguide. Nevertheless, significant miniaturization of the components of the photonic integrated circuit has occurred during the past years, rendering alignment of the incoming radiation and the device more and more difficult. One example of photonic integrated devices where miniaturization has strongly occurred are photonic integrated devices based on silicon-on-insulator. The high index contrast of SOI allows for example for fabrication of micrometer-size ring resonators which can be used for a variety of photonic applications. Coupling of radiation to the small resonators is performed using small gratings. Using such a system multiplexing can be performed, such as for example multiplexed assay systems for biosensing applications. In order to relax the alignment conditions between the irradiation source and the grating coupler for coupling to the device, flood illumination is sometimes used. When using flood illumination, a large area of the photonic integrated device is irradiated. This technique provides a very high alignment tolerance. At the same time, as useful in some applications, it allows coupling to a plurality of coupling gratings simultaneously for rapid multiplexing. Using such a solution thus allows relaxing the alignment requirements between the incoming radiation and the coupling grating.

However, flood illumination has the disadvantage that radiation that is not incident on the coupling grating but is incident in the area around the coupling grating causes parasitic radiation. Parasitic reflections on the device surface can deteriorate the operation and quality of the photonic integrated circuit and thus limit the performance.

One solution that was offered in the past is the use of a reflective gold film, in the area of the photonics device outside the coupling grating, for reflecting the radiation back into free space. A gold film then is applied as additional layer on top of the photonics device. This however is a costly and additional processing step. There is still room for improvement in systems and methods for coupling radiation into a waveguide of a photonic integrated circuit.

SUMMARY OF THE INVENTION

It is an object of embodiments of the present invention to provide efficient systems and methods for coupling radiation to a waveguide, suffering little or not from parasitic radiation.

Parasitic radiation can for example be caused by radiation that enters the irradiated surface of the device at a position where no coupling is performed and that is reflected towards the coupling region by one of the surfaces of the device.

It is an advantage of embodiments of the present invention that systems and methods are provided wherein alignment of the incoming radiation and the coupling grating is relaxed, i.e. less crucial, but wherein simultaneously the amount of parasitic radiation coupled in the waveguide of the photonics device is limited.

It is an advantage of embodiments of the present invention that the wavelength dependency of the gratings can be overcome by tuning the design parameters of the grating so as to limit wavelength dependency It is an advantage of embodiments of the present invention that the additional elements used for preventing or reducing the effect of parasitic radiation can be easily implemented. It is an advantage of embodiments of the present invention that the grating for blocking, reflecting or redirecting radiation away from the coupler grating used for solving or reducing the problem of parasitic radiation coupling to the coupling grating can be implemented at the same time of the definition of the coupling grating. The latter allows avoiding additional processing steps.

The above objective is accomplished by a method and device according to the present invention.

The present invention relates to a photonics integrated device for coupling radiation using flood illumination, the device comprising an integrated waveguide, a coupler grating at the surface of the device for coupling radiation from said flood illumination towards the integrated waveguide, and a grating for blocking, reflecting or redirecting radiation away from the coupler grating at the surface of the device, wherein the grating for blocking, reflecting or redirecting radiation away from the coupler grating is positioned relative to the coupler grating so as to prevent at least some radiation from said flood illumination, impinging at the grating for blocking, reflecting or redirecting radiation away from the coupler grating and thus impinging at a position away from the coupling grating, from being reflected within the device towards the coupler grating. It is an advantage of embodiments of the present invention that when flood irradiating an optical integrated circuit, such as a photonics integrated circuit, the grating for blocking, reflecting or redirecting radiation away from the coupler grating prevents that part of the beam which would, when reflected in the device, interfere with the radiation directly incident coupler grating is prevented from interfering. It is an advantage of embodiments of the present invention that the parasitic reflected signals and their corresponding interference pattern are efficiently reduced.

It is therefore an advantage of embodiments of the present invention that when submitted to flood irradiation, e.g. via a wide collimated laser beam, the noise is reduced compared to devices lacking a grating for blocking, reflecting or redirecting radiation away from the coupler grating. Since a wide collimated laser beam can be applied it is an advantage of embodiments of the present invention that the alignment tolerance between the fiber and the waveguide is increased compared to devices where only a smaller laser beam can be used. Traditional coupling techniques on the contrary require delicate alignment and micrometer accuracy. Therefore it is an advantage of embodiments of the present invention that they are more robust against variation of the position of incidence, e.g. vibration. It is an advantage of embodiments of the present invention that simultaneous excitation of multiple grating couplers is possible. The grating couplers might for example be organized in a compact grating coupler array. Simultaneous excitation enables better multiplexing possibilities. It is an advantage of embodiments of the present invention that the power of parasitic reflections is reduced compared to a system lacking a grating for blocking, reflecting or redirecting radiation away from the coupler grating. Therefore it is an advantage of embodiments of the present invention that, if e.g. used in a sensing application, the sensor signal is less disturbed by the parasitic reflections. In some embodiments, the features may be applied for sensing applications are envisaged. It is an advantage of embodiments of the present invention that the grating for blocking, reflecting or redirecting radiation away from the coupler grating can be implemented with the same lithographic procedure as the procedure that is used for implementing the transducer, resulting in an improved ease of implementing features for blocking, reflecting or redirecting radiation away from the coupler grating. It thus is an advantage of embodiments of the present invention that no additional processing steps are required for implementing the grating for blocking, reflecting or redirecting radiation away from the coupler grating.

The distance between the coupler grating and the grating for blocking, reflecting or redirecting radiation away from the coupler grating may be between 0,1 and 1,3 advantageously between 0,7 and 1,1 times x, x being determined as (neglecting multipath interference)

$$x = 2 \cdot \sum_i d_i \cdot \tan(\theta_i)$$

with i=1 . . . n and n corresponding with the number of layers in the photonics integrated device between the top surface and a bottom reflective surface of the photonics integrated device, where radiation is reflected, $d_i$ being the thickness of the i-th layer, and $\theta_i$=arc sin($n_0 \cdot \sin(\theta_0)/n_i$) being the direction of propagation in the i-th layer with $n_i$ the refractive index of the i-th layer, $\theta_0$ being the angle of incidence on the top surface and $n_0$ the refractive index of the medium from which the radiation is impinging, the coupler grating being optimized for an angle of incidence $\theta_0$.

The distance between the coupler grating and the grating for blocking, reflecting or redirecting radiation away from the coupler grating may be between 0,1 and 1,3 advantageously between 0,7 and 1,1 times y, y being determined as $$y = 2 \cdot n_0 \theta_0 \cdot d_{\mathit{eff}}$$

with $d_{\mathit{eff}}$ being the total effective thickness of the integrated device, which for a device of i=1 to n layers can be determined as the sum of $d_i/n_i$ over all layers, $\theta_0$ being the angle of incidence on the top surface and $n_0$ the refractive index of the medium from which the radiation is impinging, the coupler grating being optimized for an angle of incidence $\theta_0$.

The grating for blocking, reflecting or redirecting radiation away from the coupler grating may be a backward coupling grating, coupling radiation substantially parallel with the surface of the photonics integrated device, in a direction away from the coupler grating.

It is an advantage of embodiments of the present invention that incident radiation on the backward coupling grating diffracts the radiation back into free space. Therefore it is an advantage that this diffracted radiation does not propagate to the substrate region in the direction of the coupler grating.

The photonics integrated device may comprise a taper structure such that the radiation diffracted by the backward coupling grating is guided by the taper structure for dissipating the radiation diffracted by the backward coupling grating.

The grating for blocking, reflecting or redirecting radiation away from the coupler grating may be a grating adapted for diffracting the radiation back into free space. It is an advantage of embodiments of the present invention that the backwards propagating radiation coming from the backward coupling grating is dissipated and therefore not reflected on the edge of the device towards the waveguide. It is an advantage of embodiments of the present invention that the backwards propagating radiation is dissipated in the silicon slab region that covers the device surface.

The grating for blocking, reflecting or redirecting radiation away from the coupler grating may be a high contrast grating. It is an advantage of embodiments of the present invention that the high contrast grating prevents radiation from reaching the fiber coupler by maximizing the first order reflection. It is an advantage of high contrast grating that it can introduce high reflection over a wider wavelength band than the wavelength band in which for example backward coupling grating is efficient.

The device furthermore may comprise further gratings for blocking, reflecting or redirecting radiation away from the coupler grating for preventing radiation impinging on the top surface and reflecting a multiple time between the top surface and a bottom reflective surface of the device from reaching the coupler grating.

The present invention also relates to a method for manufacturing a photonics integrated device for coupling radiation into a waveguide, the method comprising a lithographic process for forming a grating structure, wherein the lithographic process is used for simultaneously forming the coupling grating and one or more gratings for blocking, reflecting or redirecting radiation away from the coupler grating in a same surface of the device. It is an advantage of embodiments of the present invention that a device with an improved noise performance can be manufactured without requiring any additional processing steps.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1A:
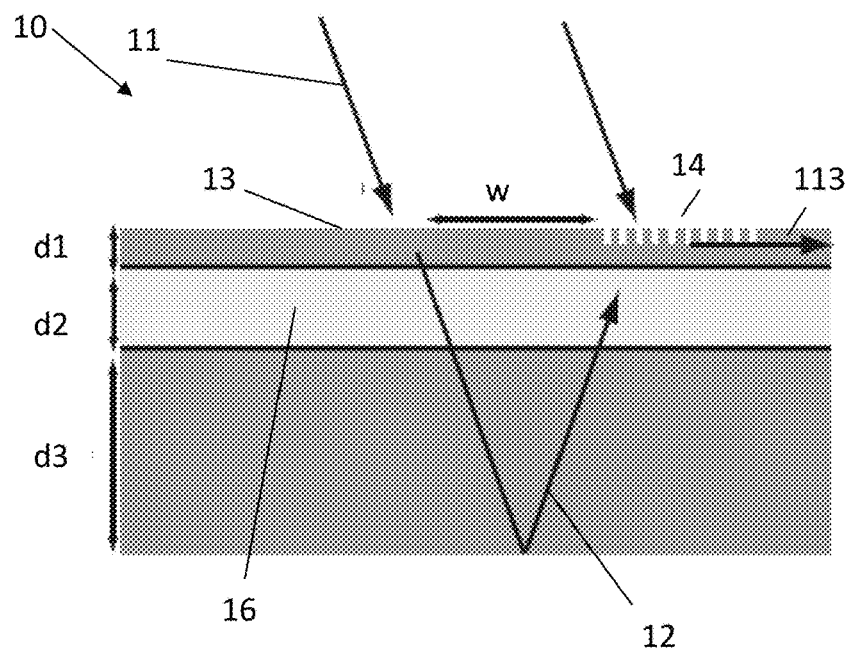
FIG. 1a is a schematic vertical cross-section of a conventional photonics integrated device known in the art and suffering from parasitic radiation during flood illumination.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "coupler grating", reference is made to a grating for coupling radiation into a waveguide.

In embodiments of the present invention reference is made to a grating for blocking, reflecting or redirecting radiation away from the coupler grating. Such a grating also may be referred to as anti-transmission grating as it prevents radiation from being transmitted to the grating by blocking radiation, reflecting radiation or redirecting transmitted radiation away from the coupler grating. Radiation that would reach the coupler grating indirectly can interfere with the radiation that impinges directly on the coupler grating, which could result in a decrease in the amount of radiation coupled in or in an extra noise channel and is therefore to be avoided.

Where in embodiments of the present invention reference is made to "the sensor signal" or "transmission signal" reference is made to the signal coming from the coupler grating.

Where in embodiments of the present invention reference is made to "the incidence angle" reference is made to the angle between the incoming radiation and the normal to the surface of the device.

Embodiments of the present invention may be applicable to any waveguide integrated optical device whereby coupling is performed from a fiber or freespace to an integrated waveguide. Such an optical device can be a photonics integrated circuit (PIC). This may refer to a variety of forms and material systems such as for example low-index contrast waveguide platforms (e.g. polymer waveguides, glass/silica waveguides, $Al_xGa_{1-x}As$ waveguides, $In_xGa_{1-x}As_yP_{1-y}$ waveguides), high-index contrast waveguides (e.g. Silicon-on-Insulator, semiconductor membranes), plasmonic waveguides (e.g. metal nano-particle arrays, metal layers), also called Photonic Lightwave circuits (PLC). A photonic integrated circuit comprises at least one integrated optical component, such as for example but not limiting to an integrated optical cavity, an integrated optical resonator, an integrated optical interferometer, an integrated optical coupler, a waveguide, a taper, a tuneable filter, a phase-shifter, a grating, a modulator, a detector, a source or a combination thereof. The optical components can be active or passive. The components can be integrated for example monolithically, heterogeneously or hybridly. Monolithical integration is the integration technology that uses a single processing flow to process the diverse components potentially using different materials, e.g. integrated germanium detectors in silicon photonics IC. Heterogeneous integration is the integration technology for which the components are processed in separate process flows, which are then integrated at die or wafer level, e.g. BCB bonding, wafer bonding, and other bonding schemes, 3D integration. Hybrid integration is the integration of components or materials on processed photonic integrated platforms, e.g. flip-chipping of detectors, bumping, gluing, wire bonding, co-packaging, etc.

In advantageous embodiments, the optical device with integrated waveguide is an SOI (Silicon-on-Insulator) material system, also referred to as silicon photonics system. However, the devices and methods of the present invention can be based on other material systems, such as for example III-V material systems, metallic layers, low index contrast material systems or a combination thereof.

Embodiments of the present invention provide a solution for parasitic radiation that is caused by irradiation of a photonics integrated device using flood illumination. Flood illumination results in a significant amount of radiation that hits the photonic integrated device outside the coupling region for coupling in radiation, typically defined by the grating coupler. By way of illustration, the occurrence of parasitic radiation is described below with reference to FIG. 1a, FIG. 1a thus illustrating a problem solved or reduced by embodiments of the present invention. FIG. 1a illustrates a conventional photonics integrated device 10, in the example shown being a silicon-on-insulator device comprising a coupling grating 14 for coupling in radiation into the device 10. When the device 10 is illuminated with a wide irradiation beam 11, e.g. a collimated laser beam, the part of the radiation that is incident on the coupling grating 14 is coupled directly into the waveguide 13. Radiation falling on the device surface in the area outside the coupling grating, e.g. in front of the grating, will be transmitted through the silicon-air interface. This beam propagates through the device substrate and reflects at the back surface. As the longitudinal component of the wavevector is conserved upon refraction, the Bragg condition for the coupler grating 14 is also met by the reflected radiation beam 12. The Bragg condition:

$$\beta = k_{in} \sin(\theta) + K$$

wherein $$\beta = \frac{2\pi}{\lambda} n_{eff}$$

is the propagation constant of the guided mode, K is defined as $$K = \frac{2\pi}{\Lambda}$$

wherein $\Lambda$ is the period of the grating and wherein $$k_{in} = \frac{2\pi}{\lambda}$$

is the wave vector and $\theta$ is the incidence angle. The reflected radiation will then couple from the oxide buffer layer 16 to the coupling grating 14 and further on to the waveguide. The round trip through the device 10 substrate introduces a significant path length difference and affects the phase of the reflected radiation 12. The phase difference between the directly coupled and the reflected radiation generates a strong interference pattern in the radiation that is coupled to the waveguide 13. The latter limits the functionality and quality of the photonics integrated device.

In a first aspect, the present invention relates to a photonics integrated device for coupling radiation using flood illumination. In embodiments of the present invention the device 100 comprises an integrated waveguide and a coupler grating 104 at the surface of the device 100 for coupling in radiation from freespace or from a fiber into the waveguide. The chip furthermore comprises a grating for blocking, reflecting or redirecting radiation away from the coupler grating 103 also at the surface of the chip 100. In embodiments of the present invention the grating for blocking, reflecting or redirecting radiation away from the coupler grating 103 is positioned such that radiation from the flood illumination that otherwise would be directed in the device and reflected at the bottom, would reach the coupler grating 104. The position of the grating for blocking, reflecting or redirecting radiation away from the coupler grating 103 is thus such that at least some of the radiation coming from the fiber is prevented from being transmitted in the device and reflected within the device 100 towards the coupler grating 104.

In embodiments of the present invention integrated optical gratings on the device surface are used to block the transmission of light. These integrated optical gratings are also called gratings for blocking, reflecting or redirecting radiation away from the coupler grating 103. At least one grating for blocking, reflecting or redirecting radiation away from the coupler grating is provided, although embodiments are not restricted thereto and more gratings for blocking, reflecting or redirecting radiation away from the coupler grating can be provided, e.g. for preventing radiation from th flood illumination that elsewise would reach the coupler grating after multiple reflections. The gratings for blocking, reflecting or redirecting radiation away from the coupler grating 103 are placed in positions that lead to the parasitic radiation paths that cause interference signals via reflections on the backside of the device. By placing the gratings for blocking, reflecting or redirecting radiation away from the coupler grating 103, the parasitic radiation paths causing interference with the radiation being coupled into the waveguide are significantly reduced. In embodiments of the present invention this reduction can be more than 10 dB preferably more than 20 dB.

The distance between at least one grating for blocking, reflecting or redirecting radiation away from the coupler grating and the coupler grating may be determined based on the angle of incidence, the number of layers present in the device and passed before a reflective layer is reached, the material type, etc. For example, the distance between the coupler grating and the grating for blocking, reflecting or redirecting radiation away from the coupler grating is between 0, 1 and 1, 3 times x advantageously between 0, 7 and 1, 1 times x, x being determined as $$x = 2 \cdot \sum_i d_i \cdot \tan(\theta_i)$$

with i=1 . . . n and n corresponding with the number of layers in the photonics integrated device between the top surface and a bottom reflective surface of the photonics integrated device, where radiation is reflected, $d_i$ being the thickness of the i-th layer, and $\theta_i$=arc $\sin(n_0 \cdot \sin(\theta_0)/n_i)$ being the direction of propagation in the i-th layer with $n_i$ the refractive index of the i-th layer, $\theta_0$ being the angle of incidence on the top surface and $n_0$ the refractive index of the medium from which the radiation is impinging. The photonics integrated device may typically be optimized for a given angle of incidence $\theta_0$.

When there is substantially vertical incidence, the distance between the coupler grating and the grating for blocking, reflecting or redirecting radiation away from the coupler grating is between 0, 1 and 1, 3 advantageously may be between 0, 3 and 1, 1 times y, y being determined as $$y = 2 \cdot n_0 \cdot \theta_0 \cdot d_{eff}$$

with $\theta_0$ being the angle of incidence on the top surface and $n_0$ the refractive index of the medium from which the radiation is impinging and $d_{eff}$ the total effective thickness of the integrated device. Again, the photonics integrated device, and more particularly the coupler grating, may be optimized for a given angle of incidence $\theta_0$.

The gratings for blocking, reflecting or redirecting radiation away from the coupler grating 103 can be manufactured during the same processing steps as during which the coupler grating 104 is produced. This compared to prior art solutions where for example an additional gold layer is required to avoid the parasitic radiation paths causing interference. For these prior art solutions additional, separate, processing is required. In embodiments of the present invention the gratings for blocking, reflecting or redirecting radiation away from the coupler grating 103 change the transmission characteristics of the surface of the device 100 such that parasitic radiation paths that would interfere with the radiation being coupled into the waveguide are now significantly reduced or even eliminated. In embodiments of the present invention the gratings for blocking, reflecting or redirecting radiation away from the coupler grating 103 have a wavelength dependent transmission characteristic. The reduction of the parasitic radiation paths causing interference is therefore wavelength dependent. In embodiments of the present invention the wavelength dependency is limited by optimizing the design parameters of the grating for blocking, reflecting or redirecting radiation away from the coupler grating 103. Therefore in embodiments of the present invention the effective working range of the grating for blocking, reflecting or redirecting radiation away from the coupler grating corresponding with a reduction of the parasitic radiation paths of 10 dB is above 4 nm preferably above 8 nm. Grating design features may encompass a variable line-spacing grating spacing (apodised grating), changing the height or other geometrical parameters of the grating, using a variable etching depth, using a variable filling factor, . . . .

In embodiments of the present invention flood radiation, e.g. using a collimated laser beam or a fiber, is used to illuminate the device surface. Whereas for small beams a delicate alignment between the fiber and the fiber coupling grating is required, in the present embodiments flood irradiation can be used and the alignment is not critical as radiation that impinges on the substrate outside the coupler grating region is prevented from reaching the coupler grating. As a consequence of using flood irradiation the coupling will be more robust against vibrations.

In embodiments of the present invention the device 100 may comprise a compact array of coupler gratings 104 and gratings for blocking, reflecting or redirecting radiation away from the coupler grating 103, e.g. when multiplexing is performed. In these embodiments of the present invention such a compact grating coupler array is simultaneously excited using a wide collimated laser beam for better multiplexing possibilities. The gratings for blocking, reflecting or redirecting radiation away from the coupler grating 103 in front of the coupler gratings 104 thereby reduce the reflections which are interfering in the coupler gratings 104.

Figure 1B:
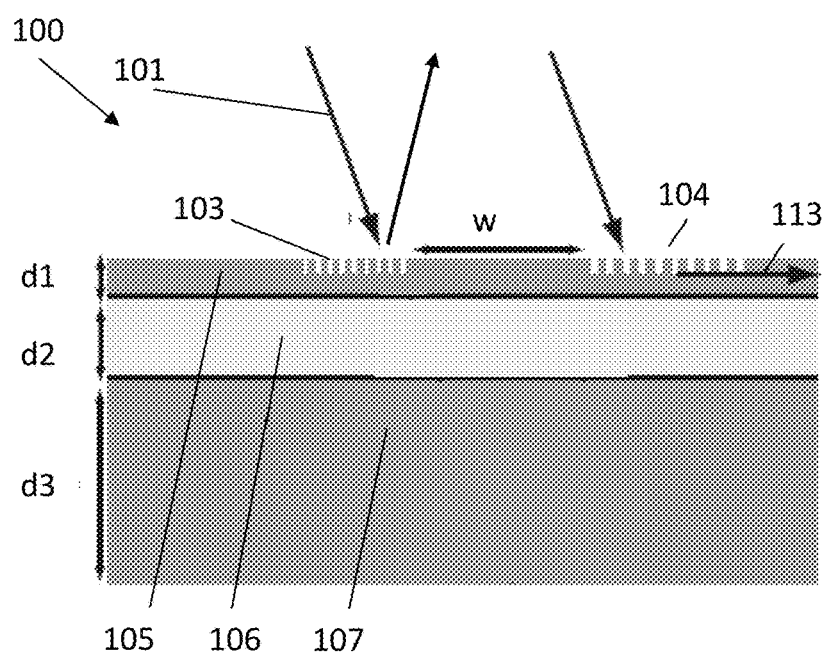
FIG. 1b is a schematic vertical cross-section of a photonics integrated device with a grating for blocking, reflecting or redirecting radiation away from the coupler grating in accordance with an embodiment of the present invention.

FIG. 1 illustrates a vertical cross-section of a device 100 in accordance with an exemplary embodiment of the present invention. The exemplary device 100 illustrated in FIG. 1 comprises:

a thick silicon substrate 107 with a thickness d3 of 725 µm, a thick oxide buffer layer 106 with a thickness d2 of 2 µm, a silicon top layer being the waveguide layer 105 with a thickness d1 of 220 nm.

Although the specific values used in the example are indicated, the thickness of the different layers could be different. In some examples, the thickness d1 could be between 10 nm and 1000 nm, the thickness d2 could be between 500 nm and 5000 nm and the thickness d3 could be between 500 µm and 5 mm. Although not in the present example, it is to be noticed that also additional dielectric layers such as SiN or $SiO_2$ could be present.

In the exemplary embodiment of FIG. 1 the thickness of the thick silicon substrate 107 is 725 µm. For a device thickness of 725 µm, the location of the grating for blocking, reflecting or redirecting radiation away from the coupler grating 103 on the surface of the device 100 is calculated to be 73 µm in front of the coupler grating 104. The angle of incidence used is 10°. In this position, the grating for blocking, reflecting or redirecting radiation away from the coupler grating 103 will prevent the incident radiation 101 to be transmitted to the back of the substrate and reflected up to the coupler grating 104. This grating for blocking, reflecting or redirecting radiation away from the coupler grating therefore reduces the parasitic interferences.

The device 100 illustrated in FIG. 1 comprises a grating for blocking, reflecting or redirecting radiation away from the coupler grating 103 in front of a fiber coupling grating 104. Both gratings are patterned in the silicon top layer being the waveguide layer 105. By way of illustration, the device 100 is illuminated with a wide collimated laser beam 101.

Figure 2:
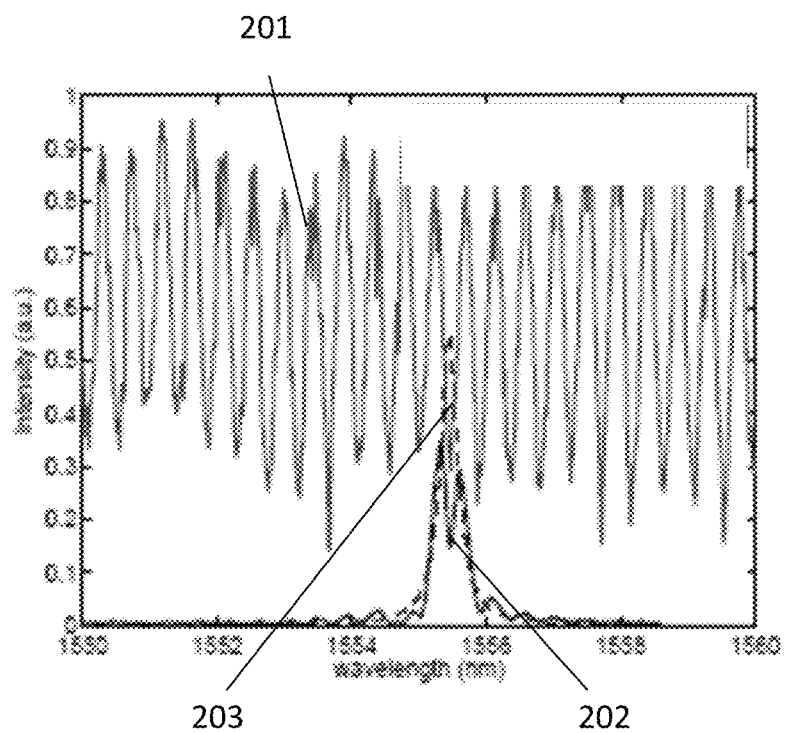
FIG. 2 shows the transmission signal disturbed by interference due to parasitic reflections and the transmission signal not disturbed by interference.

In the exemplary embodiments of the present invention the waveguide is part of a microring sensor, although embodiments of the present invention are not limited thereto. The curve 202 in FIG. 2 shows the spectrum of the sensor signal 202. The curve 203 shows the undisturbed spectrum of the sensor signal. In the illustrative example the pattern in the transmitted power has a period of 450 pm and modulates the sensor signals to an extent that the peak intensity is greatly suppressed and that the sensor signal is effectively destroyed. The minimum period corresponds with one reflection, while higher order reflections will decrease the period. The interference pattern severely deteriorates or even completely destroys the sensor signal.

Figure 3:
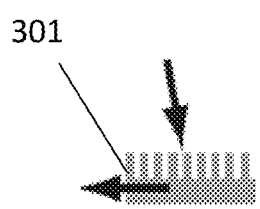
FIG. 3 shows a schematic representation of radiation propagation for backward contrast grating in accordance with embodiments of the present invention.
Figure 5:
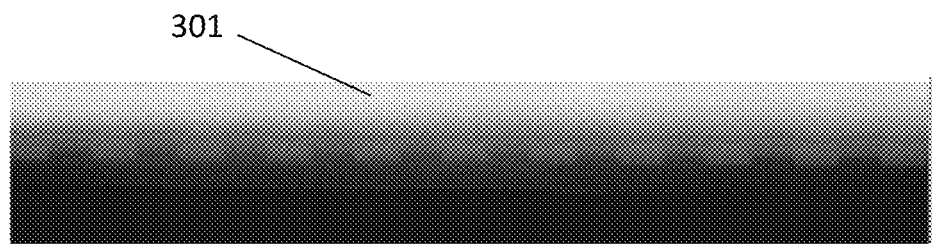
FIG. 5 shows a TEM image of a backward coupling grating in accordance with embodiments of the present invention.

In some embodiments of the present invention the grating for blocking, reflecting or redirecting radiation away from the coupler grating 103 is a backward coupling grating 301 that diffracts the radiation away from the waveguide and the coupler grating 104. The working principle of such a backward coupling grating 301 is schematically illustrated in FIG. 3. A TEM image of such a backward coupling grating 301 is shown in FIG. 5. Instead of being refracted to the substrate region and reflected towards the fiber coupling grating 104, the radiation is refracted by the grating for blocking, reflecting or redirecting radiation away from the coupler grating away from the waveguide and the coupler grating 104. In embodiments of the present invention the grating for blocking, reflecting or redirecting radiation away from the coupler grating 103 couples the radiation into an additional waveguide that guides the radiation away from the photonic integrated circuits.

In an exemplary embodiment of the present invention the backward coupling grating is realized by etching 70 nm deep lines in the waveguide layer 105. In the exemplary embodiment the waveguide layer 105 has a thickness d1 of 220 nm. These lines have a duty cycle of 50%. If the incident radiation 101 has a wavelength of 1550 nm and an incidence angle of 10° the Bragg condition implies that the grating period of the backward coupling grating is 540 nm. Advantageously, the grating for blocking, reflecting or redirecting radiation away from the coupler grating is not or not much larger than the coupler grating as the parasitic transmission to the substrate has to be blocked in an area equal to that of the coupler grating.

In embodiments of the present invention the device 100 may comprise a taper structure such that the radiation diffracted by the backward coupling grating is guided by the taper structure for dissipating the radiation diffracted by the backward coupling grating.

In some embodiments of the present invention the backward propagating radiation is dissipated in the silicon slab region that covers the device surface using a taper structure.

Figure 4:
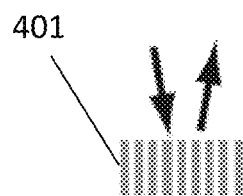
FIG. 4 shows a schematic representation of radiation propagation for high contrast grating in accordance with embodiments of the present invention.
Figure 6:
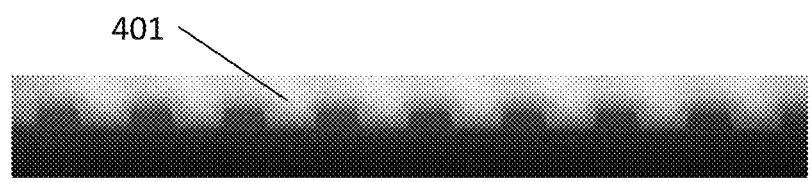
FIG. 6 shows a TEM image of a high contrast grating in accordance with embodiments of the present invention.

In some embodiments of the present invention the grating for blocking, reflecting or redirecting radiation away from the coupler grating 103 is a high contrast grating 401 that maximizes the first order reflection coefficient of the device surface. Instead of guiding the radiation to the slab region, the high contrast region prevents radiation from reaching the coupler grating 104 by maximizing the first order reflection. It is an advantage of embodiments of the present invention that high contrast gratings have a high reflection over wide wavelength bands. Depending on optimisation of the high contract gratings, attenuation of higher than 99.5% over a 70 nm range have been reported. It is an advantage of embodiments of the present invention that the fabrication tolerances are relatively large, as was for example also described by Zhou et al. in IEEE Photonics Technology Letters, vol. 20, 2008 (6) 434-436. The working principle of such a high contrast grating 401 is schematically illustrated in FIG. 4. A TEM image of such a high contrast grating 301 is shown in FIG. 6.

Figure 7:
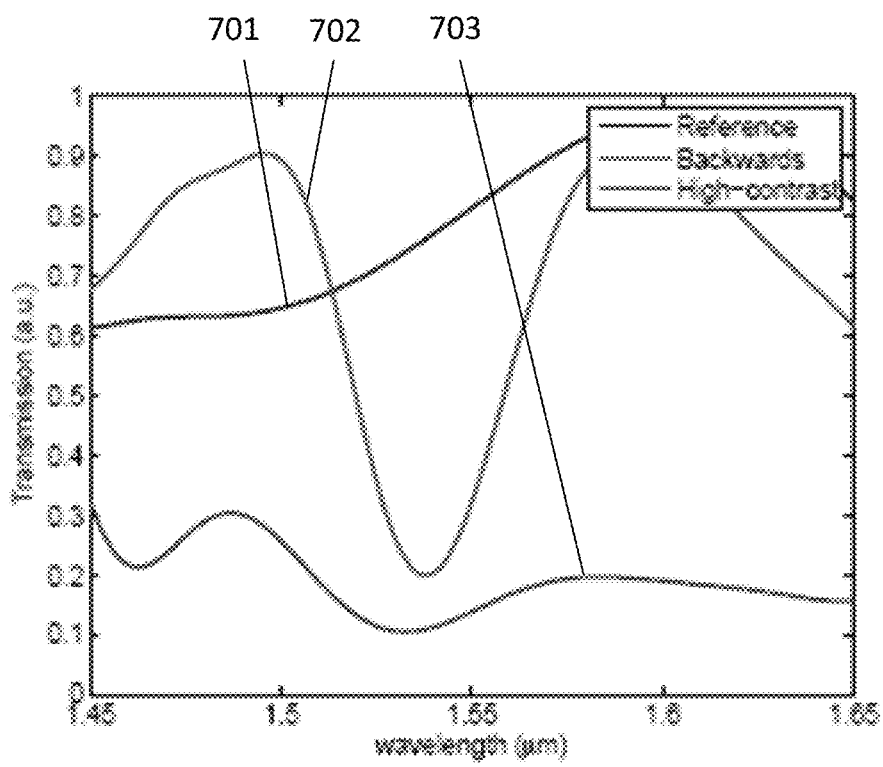
FIG. 7 shows the simulated transmission to the substrate for different ant-transmission gratings in accordance with embodiments of the present invention.

By way of illustration, FIG. 7 shows the simulated transmission of incident radiation 101 into the substrate of the device 100 in function of the wavelength of the incident radiation 101. The simulated transmission is expressed in an arbitrary unit. The curve 701 is a reference curve showing the simulated transmission in case no grating for blocking, reflecting or redirecting radiation away from the coupler grating 103 is present. Curve 702 shows the simulated transmission in case a backward coupling grating is present. Curve 703 shows the simulated transmission in case a high contrast grating is present. From the graph in FIG. 7 it is clear that both the high contrast grating 401 as well as for the backward coupling grating 301 significantly reduce the transmitted power into the substrate compared to the case where no grating is present. FIG. 7 also illustrates that the backward coupling grating is only efficient in a narrow band around the wavelength of 1550 nm for which it is designed. The high contrast grating on the contrary can introduce high reflection over a relatively wide wavelength band, as indicated above. By optimizing the design of the high contrast grating 401 the bandwidth can be increased even more. A bandwidth of tens of nanometer can thus be reached.

The high contrast grating 401 and the backward coupling grating 301 are two examples of a grating for blocking, reflecting or redirecting radiation away from the coupler grating 103 according to embodiments of the present invention. Other gratings for blocking, reflecting or redirecting radiation away from the coupler grating are also possible. It is for example not required that the distance between the lines of the grating is fixed over the complete grating. In embodiments of the present invention the distance between the lines of the grating may be position dependent.

By way of illustration the exemplary embodiment of FIG. 1 is tested in a measurement setup. The device 100 is therefore mounted on a measurement chuck for characterization. A collimated laser beam illuminates the coupler grating 104 and the surrounding device surface. The tunable laser is swept at 5 nm/s over a 20 nm range with a wavelength resolution of 10 pm. An IR-camera is used to record the output spectra with a framerate of 500 Hz.

Figure 8:
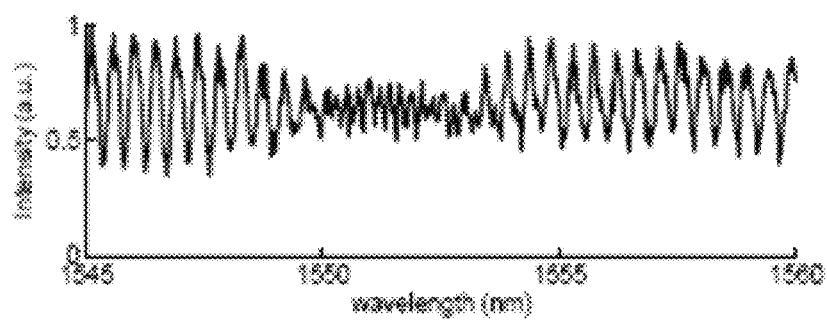
FIG. 8 shows the transmission spectrum of the fiber coupler combined with a backward coupling grating in front of the coupler grating in accordance with embodiments of the present invention.
Figure 10:
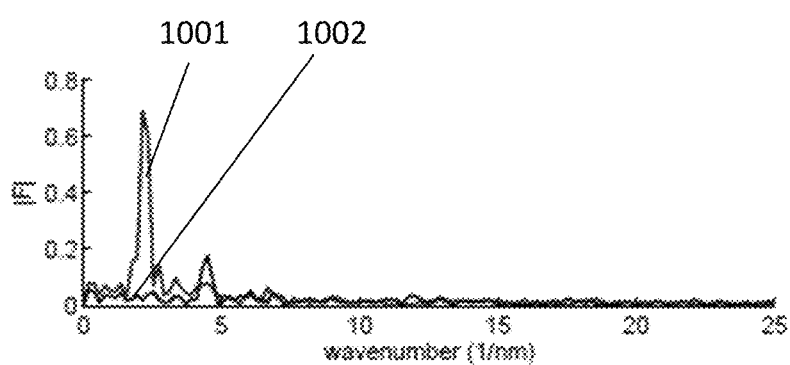
FIG. 10 shows the Fourier spectrum of a wavelength range inside the effective region of the backward coupling grating and a Fourier spectrum outside the grating effective region in accordance with embodiments of the present invention.

FIG. 8 shows the transmission spectrum of a fiber coupling grating 104 combined with a backward coupling grating 301 wherein the backward coupling grating has a grating period of 530 nm. The transmission spectrum in FIG. 8 shows a region around 1551.5 nm wherein reduced interference effects are clearly visible. This suppression region corresponds to the backward coupling grating wavelength targeted during design. FIG. 10 shows the Fourier transform of the transmission spectrum in FIG. 8. FIG. 10 compares the Fourier spectrum of a 3 nm region around 1551.5 nm (curve 1002 with backward coupling grating effect) to that of a 3 nm region with maximum interference strength (curve 1001 without grating effect). The transmitted power with a period of 450 pm is successfully suppressed in the 3 nm region around 1551.5 nm. This can be clearly seen when comparing curve 1001 in a 3 nm region with maximum interference strength with curve 1002 in a region where the incident radiation is diffracted away from the coupler grating 104 by the backward coupling grating 301. The suppression region of the curve in FIG. 8 shows the occurrence of a component corresponding to 220 pm oscillations but with a significantly lower intensity. This component is also visible in the Fourier spectrum in FIG. 10 in curve 1002 around wavenumber 5 corresponding with the 220 pm oscillation. In the exemplary embodiment of FIG. 1 the incident radiation 101 on the backward coupling grating 301 is diffracted away from the coupler grating 104 by the backward coupling grating 301. However the radiation incident on the device 100, 146 μm before the coupler grating 104 and before the backward coupling grating 301, will result in a second order reflection of the device substrate. Radiation incident on the device surface 146 μm in front of the fiber coupler will make two round trips through the substrate, reflecting twice off the bottom surface and thus arriving at the coupler grating 104 with lower intensity and giving rise to less pronounced interference effects.

In embodiments of the present invention an additional grating for blocking, reflecting or redirecting radiation away from the coupler grating may be positioned in the position leading to the second order reflections (e.g. an additional backward coupling grating). This will cause a decrease of the second order peak in the spectrum.

Figure 9:
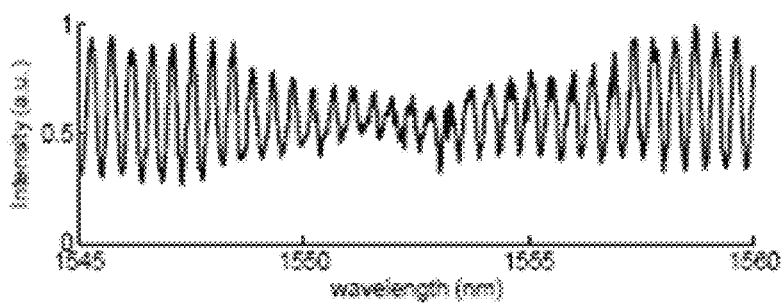
FIG. 9 shows the transmission spectrum of the fiber coupler combined with a high contrast grating in front of the coupler grating in accordance with embodiments of the present invention.
Figure 11:
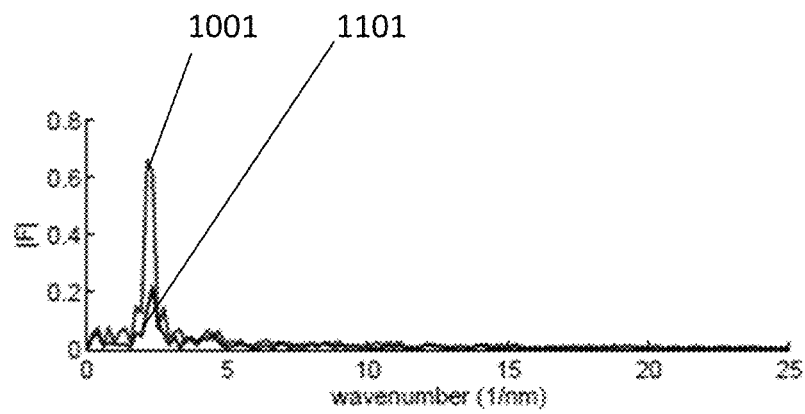
FIG. 11 shows the Fourier spectrum of a wavelength range inside the effective region of the high contrast grating and a Fourier spectrum outside the grating effective region in accordance with embodiments of the present invention.

In an exemplary embodiment of the present invention, schematically illustrated in FIG. 1, a high contrast grating 401 is implemented 73 μm before the coupler grating 104. The period of the high contrast grating 401 in the exemplary embodiment is 1050 nm. FIG. 9 shows the transmission spectrum when illuminating the device 100 with incident radiation 101 according to FIG. 1 whereby a tunable laser is swept at 5 nm/s over a 20 nm range with a wavelength resolution of 10 pm. In the exemplary embodiment with the high contrast grating 401 the 450 pm period remains the dominant oscillation while its strength is significantly reduced. This can be seen from FIG. 9 in the 1551.5 nm region and also from FIG. 11 showing the Fourier spectra of a region within the 1551.5 nm region and of a region outside the 1551.5 nm region. A small component at 220 pm can barely be discerned from noise.

By way of illustration the measurement results from the previous paragraphs are modelled by the following formulas. The intensity pattern in the signal waveguide can be modelled as a two beam interference signal given by:

$$I = I_1 + I_2 + 2\sqrt{I_1 I_2} \cos(\Delta\Phi)$$

Wherein $I_1$ is the intensity of the incident radiation 101 coupling directly into the waveguide through the coupler grating 104, and $I_2$ is the intensity of the radiation coupling in the waveguide via reflections on the backside, and $\Delta\Phi$ accounts for the path length difference between both interfering waves. As the Fourier components from FIG. 10 and FIG. 11 originate from the only oscillating term in the equation above, they are proportional to the amplitude of the cosine, or $2\sqrt{I_1 I_2}$. Comparison of the two Fourier spectra in FIG. 10 or in FIG. 11 enables determining the reduction in intensity of the parasitic beam as a consequence of the implementation of the grating for blocking, reflecting or redirecting radiation away from the coupler grating 103. The suppression efficiency of the intensity reduction grating or grating for blocking, reflecting or redirecting radiation away from the coupler grating 103 is given by:

$$10\log_{10}\left[\left(\frac{X_1}{X_2}\right)^2\right]$$

wherein X1 is the amplitude of the dominant Fourier component outside the region of effect of the grating for blocking, reflecting or redirecting radiation away from the coupler grating 103. This is the maximum of the first curve 1001 in FIG. 10 (backward coupling grating) or FIG. 11 (high contrast grating). X2 in the formula is the amplitude of the dominant Fourier component inside the region of effect of the grating for blocking, reflecting or redirecting radiation away from the coupler grating 103. This is the maximum of the second curve 1002 in FIG. 10 or the maximum of the second curve 1101 in FIG. 11. For the backward coupling grating 103, the signal originating from second order reflections becomes dominant in the suppressed region while the 450 pm component is completely suppressed. For evaluating the improvement in the intensity pattern in the signal waveguide therefore, the strength of the Fourier component corresponding to 220 pm period oscillations should be used for X2 in the logarithmic expression above. For the high contrast grating, the 450 pm component remains dominant, so X2 corresponds to the Fourier component of this period. In the exemplary embodiment with the backward coupling grating an efficiency increase of 12 dB is realized. In the exemplary embodiment with the high contrast reflection grating 10 dB is realized. The calculated efficiencies are only valid for the grating effect around the central grating wavelength.

Figure 12:
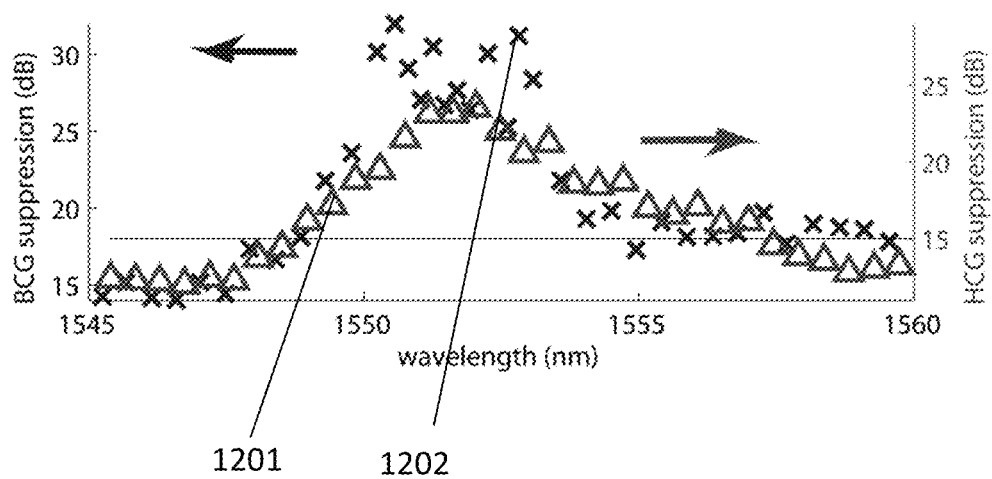
FIG. 12 shows the wavelength dependency of the ratio $I_1/I_2$ for the high contrast and the backward coupling grating in accordance with embodiments of the present invention.

By way of illustration, the efficiency of the grating for blocking, reflecting or redirecting radiation away from the coupler grating in function of the wavelength can be calculated using a different model. The strength of the interference pattern is also apparent in the extinction ratio of consecutive fringes. From the model of the intensity pattern in the signal waveguide, the dependence of the ratio I1/I2 on the extinction ratio is analytically calculated to be:

$$\sqrt{I_1/I_2} = \frac{(1-z)}{-(1+z) + \sqrt{4z}}$$

wherein z is the intensity ratio between consecutive maxima and minima of the spectrum. FIG. 12 shows the wavelength dependency of the ratio $I_1/I_2$ for exemplary embodiments of the present invention. In the first embodiment the grating for blocking, reflecting or redirecting radiation away from the coupler grating 103 is a backward coupling grating and in the second embodiment the grating for blocking, reflecting or redirecting radiation away from the coupler grating 103 is a high contrast grating. Graph 1201 shows the suppression for a high contrast grating and graph 1202 shows the suppression for a backward coupling grating. The horizontal line in FIG. 5 represents the suppression threshold. It can be seen from FIG. 5 that the backward coupling grating in the exemplary embodiment has a higher maximum suppression than the high contrast grating. On the other hand the high contrast grating is effective over a wider wavelength range.

Without grating effect, $I_2$ is found to be 12 to 15 dB weaker than the intensity of radiation coupling directly into the waveguide.

In the exemplary embodiment of the present invention, where backward coupling grating is used as grating for blocking, reflecting or redirecting radiation away from the coupler grating 103, an extinction up to 27 dB due to the backward coupling grating was experimentally measured. This is 12 dB higher than the baseline in FIG. 12. The extinction is limited by second-order reflections of the device substrate. The direct transmission through the grating is practically completely eliminated, as suggested by the Fourier spectrum.

At an arbitrary suppression level of 3 dB the bandwidth of the suppressed region is 6 nm, with a 4 nm region that exceeds 10 dB suppression.

In the exemplary embodiment of the present invention, where high contrast grating 401 is used as grating for blocking, reflecting or redirecting radiation away from the coupler grating 103, a reduction of the intensity $I_2$ up to 24 dB is calculated. This means a suppression of 11 dB. The maximum suppression is reduced compared to the backward coupling grating, but the suppression threshold is exceeded over a wider range, i.e. 8 nm. The suppression efficiencies obtained from the spectral representation correspond very well to values calculated from the Fourier components. The difference between simulation and experiment for the high contrast grating can be attributed to the simulation model, which is less suited for describing the very fast phase changes in the high-contrast region and the design parameters are not accurately predicted.

Figure 13:
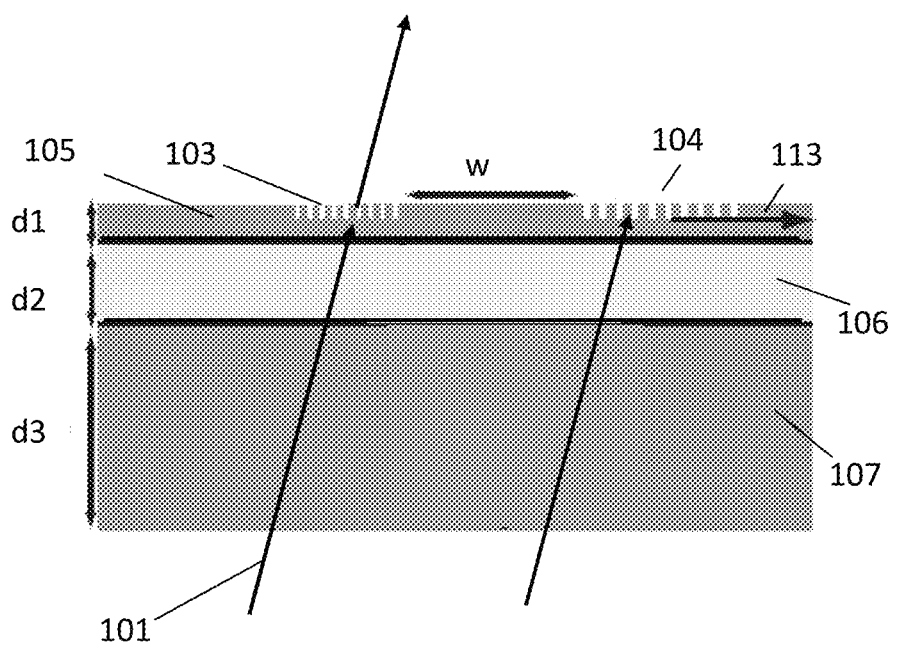
FIG. 13 shows an alternative device comprising a grating for blocking, reflecting or redirecting radiation away from the coupler grating, according to an embodiment of the present invention.

By way of further illustration, FIG. 13 illustrates an alternative embodiment whereby both a coupler grating and a grating for blocking, reflecting or redirecting radiation away from the coupler grating are present at a surface of the device. In the present embodiment, flood illumination is performed through a bottom surface of the device. The flood illumination propagates to the surface where the coupler grating and the grating for blocking, reflecting or redirecting are present. Radiation reaching the coupler grating directly is coupled by the coupler grating into the waveguide. At least some radiation of the flood illumination reaching the surface outside the area of the coupler grating which could, by reflection, reach the coupler grating and interfere with the radiation directly impinging on the grating coupler, is blocked, reflected or redirected away from the coupler grating. In this way the parasitic radiation interfering negatively with the radiation directly caught by the coupler grating can be avoided. In the present example, the grating for blocking, reflecting or redirecting, redirects the radiation away from the coupler grating.

In a second aspect, embodiments of the present invention relate to a method for manufacturing a device 100 for coupling radiation from a fiber into a waveguide. In embodiments of the present invention the grating for blocking, reflecting or redirecting radiation away from the coupler grating 103 is implemented with the same lithographic procedure which is used for implementing the coupler grating 104. Therefore it is an advantage of embodiments of the present invention that no additional processing steps are required for implementing the grating for blocking, reflecting or redirecting radiation away from the coupler grating 103. In a prior art solution metal deposition is used to prevent parasitic reflection from disturbing the signal. This prior art solution however requires alterations in the device processing steps. Lithographic procedures for implementing gratings are known as such in literature and are therefore not discussed in more detail here.

In some embodiments of the present invention the waveguide may be used as a biosensor transducer. The waveguide might for example be a silicon-on-insulator microring resonator which is an excellent platform for label-free nanophotonic biosensors. The high index contrast of the silicon-on-insulator platform causes high confinement of the optical fields in the waveguides, which makes the microrings very sensitive to changes on the waveguide surface. These changes might be caused by the presence of biomaterials. In embodiments of the present invention the biomaterial causes a change in the refractive index at the surface of the biosensor and this induces a shift in wavelength which is visible in the sensor signal. It is an advantage of embodiments of the present invention that the radiation which would normally be reflected onto the coupler grating 104 and interfere with the sensor signal is attenuated in embodiments of the present invention by the presence of the grating for blocking, reflecting or redirecting radiation away from the coupler grating 103. If not, the reflected radiation would interfere with the sensor signal. Moreover the reflected radiation is not shifting its wavelength in the presence of biomaterials making interpretation even more difficult in systems lacking a grating for blocking, reflecting or redirecting radiation away from the coupler grating 103.

The high index contrast of the silicon-on-insulator platform allows for fabrication of micrometer-size sensors and a high degree of multiplexing. In embodiments of the present invention flood illuminating an array of vertical grating couplers is used to couple input radiation into the device waveguides. It is an advantage of embodiments of the present invention that flood illumination enables robust, low-noise performance of a microring resonator sensor device in a lab-on-a-chip setting. It is an advantage of embodiments of the present invention that flood illumination provides a very high alignment tolerance compared to a fragile fiber-device interface It is an advantage of embodiments of the present invention that the flood illumination allows simultaneous excitation of multiple sensors for rapid parallel read-out. In embodiments of the present invention a grating for blocking, reflecting or redirecting radiation away from the coupler grating 103 prevents that parasitic reflections on the device substrate deteriorate the sensor signal and limit the performance (e.g. the performance of microring resonator biosensors). The exemplary embodiments with a backward coupling grating or a high contrast grating have a suppression region that is wide enough to cover the free-spectral range of the microring sensors which is 4 nm.

The invention claimed is:

1. A photonics integrated device for coupling radiation using flood illumination, the device comprising:
   an integrated waveguide,
   a coupler grating at a surface of the device for coupling radiation from said flood illumination towards the integrated waveguide, and
   a grating for blocking, reflecting or redirecting radiation away from the coupler grating and away from the integrated waveguide, the grating for blocking, reflecting or redirecting at the surface of the device, wherein the grating for blocking, reflecting or redirecting radiation away from the coupler grating is positioned relative to the coupler grating so as to prevent at least some radiation from said flood illumination, impinging at the grating for blocking, reflecting or redirecting radiation away from the coupler grating and thus impinging at a position of said surface away from the coupling grating, from being reflected within the device towards the coupler grating;
wherein the distance between the coupler grating and the grating for blocking, reflecting or redirecting radiation away from the coupler grating is between 0,1 and 1,3 times x, x being determined as (neglecting multipath interference)

$$x = 2 \cdot \sum_i d_i \cdot \tan(\theta_i)$$

with i =1... n and n corresponding with the number of layers in the photonics integrated device between the top surface and a bottom reflective surface of the photonics integrated device, where radiation is reflected, $d_i$ being the thickness of the i-th layer, and $\theta_i = \arcsin(n_0 \cdot \sin(\theta_0)/n_i)$ being the direction of propagation in the i-th layer with $n_i$ the refractive index of the i-th layer, $\theta_0$ being the angle of incidence on the top surface and $n_0$ the refractive index of the medium from which the radiation is impinging,
the coupler grating being optimized for an angle of incidence $\theta_0$.

2. The photonics integrated device according to claim 1, wherein the distance between the coupler grating and the grating for blocking, reflecting or redirecting radiation away from the coupler grating is between 0,1 and 1,3 times y, y being determined as
$y=2 \cdot n_0 \cdot \theta_0 \cdot d_{eff}$ with $\theta_0$ being the angle of incidence on the top surface and $n_0$ the refractive index of the medium from which the radiation is impinging, and $d_{eff}$ the effective thickness of the photonics integrated device, the coupler grating being optimized for an angle of incidence $\theta_0$.

3. The photonics integrated device according to claim 1, wherein the grating for blocking, reflecting or redirecting radiation away from the coupler grating is a backward coupling grating, coupling radiation from said flood illumination substantially parallel with the surface of the photonics integrated device, in a direction away from the coupler grating.

4. The photonics integrated device according to claim 3, the photonics integrated device comprising a taper structure such that the radiation diffracted by the backward coupling grating is guided by the taper structure for dissipating the radiation diffracted by the backward coupling grating.

5. The photonics integrated device according to claim 1, wherein the grating for blocking, reflecting or redirecting radiation away from the coupler grating is a grating adapted for diffracting the radiation back into free space.

6. The photonics integrated device according to claim 5, wherein the grating for blocking, reflecting or redirecting radiation away from the coupler grating (103) is a high contrast grating.

7. The photonics integrated device according to claim 1, wherein the device furthermore comprises further gratings for blocking, reflecting or redirecting radiation away from the coupler grating for preventing radiation impinging on a top surface and reflecting a multiple time between the top surface and a bottom reflective surface of the device from reaching the coupler grating.

8. A method for manufacturing the photonics integrated device according to claim 1 for coupling radiation into the waveguide using flood illumination, the method comprising a lithographic process for forming the grating structure, wherein the lithographic process is used for simultaneously forming the coupling grating and one or more gratings for blocking, reflecting or redirecting radiation away from the coupler grating in the top surface of the device.

9. A photonics integrated device for coupling radiation using flood illumination, the device comprising:
an integrated waveguide,
a coupler grating at a surface of the device for coupling radiation from said flood illumination towards the integrated waveguide, and
a grating for blocking, reflecting or redirecting radiation away from the coupler grating and away from the integrated waveguide, the grating for blocking, reflecting or redirecting at the surface of the device, wherein the grating for blocking, reflecting or redirecting radiation away from the coupler grating is positioned relative to the coupler grating so as to prevent at least some radiation from said flood illumination, impinging at the grating for blocking, reflecting or redirecting radiation away from the coupler grating and thus impinging at a position of said surface away from the coupling grating, from being reflected within the device towards the coupler grating;
wherein the distance between the coupler grating and the grating for blocking, reflecting or redirecting radiation away from the coupler grating is between 0,1 and 1,3 times y, y being determined as
$y=2 \cdot n_0 \cdot \theta_0 \cdot d_{eff}$ with $\theta_0$ being the angle of incidence on the top surface and $n_0$ the refractive index of the medium from which the radiation is impinging, and $d_{eff}$ the effective thickness of the photonics integrated device, the coupler grating being optimized for an angle of incidence $\theta_0$.

* * * * *